United States Patent [19]

Benser

[11] 4,202,516
[45] May 13, 1980

[54] ELECTRONIC TRIPOD TECHNIQUE

[75] Inventor: Earl H. Benser, Bloomington, Minn.

[73] Assignee: The United States of America as represented by the Secretary of the Air Force, Washington, D.C.

[21] Appl. No.: 921,140

[22] Filed: Jun. 30, 1978

[51] Int. Cl.² ............................................. F42B 15/00
[52] U.S. Cl. .................................................. 244/3.15
[58] Field of Search ....................... 244/3.1, 3.15, 3.19, 244/3.21; 73/178 R

[56] References Cited

U.S. PATENT DOCUMENTS

| 2,824,710 | 2/1958 | Hall .................................... | 244/3.19 |
| 2,869,804 | 1/1959 | Muinch et al. ...................... | 244/3.15 |
| 2,981,500 | 4/1961 | Carlton ............................... | 244/3.15 |
| 3,167,276 | 1/1965 | Moosbrugger et al. ............ | 244/3.15 |

*Primary Examiner*—Charles T. Jordan
*Attorney, Agent, or Firm*—Joseph E Rusz; James S. Shannon

[57] ABSTRACT

An electronic tripod technique for postlaunch alignment of the roll and pitch gyros of a missile inertial guidance system. Prior to launch, missile gyros are spun up and caged to the missile airframe axes. At launch, gyros are uncaged and slant range to ground measured over an azimuthal sweep symmetrical to the plane of the missile's roll and yaw axes. A roll error signal proportional to the difference between the slant ranges at the sweep extremes is generated and used to torque the roll gyro, resulting in a rotation of the missile about its roll axis until the error signal is zero. This establishes a new roll reference at the roll gyro that is normal to the local vertical. A pitch error signal is then generated that is proportional to the difference between the slant range at either sweep extreme and the slant range at 0° azimuth. Similarly, this signal is used to torque the pitch gyro and establish a new pitch reference normal to the local vertical, thus completing the alignment of the roll and pitch gyros to the local vertical.

2 Claims, 5 Drawing Figures

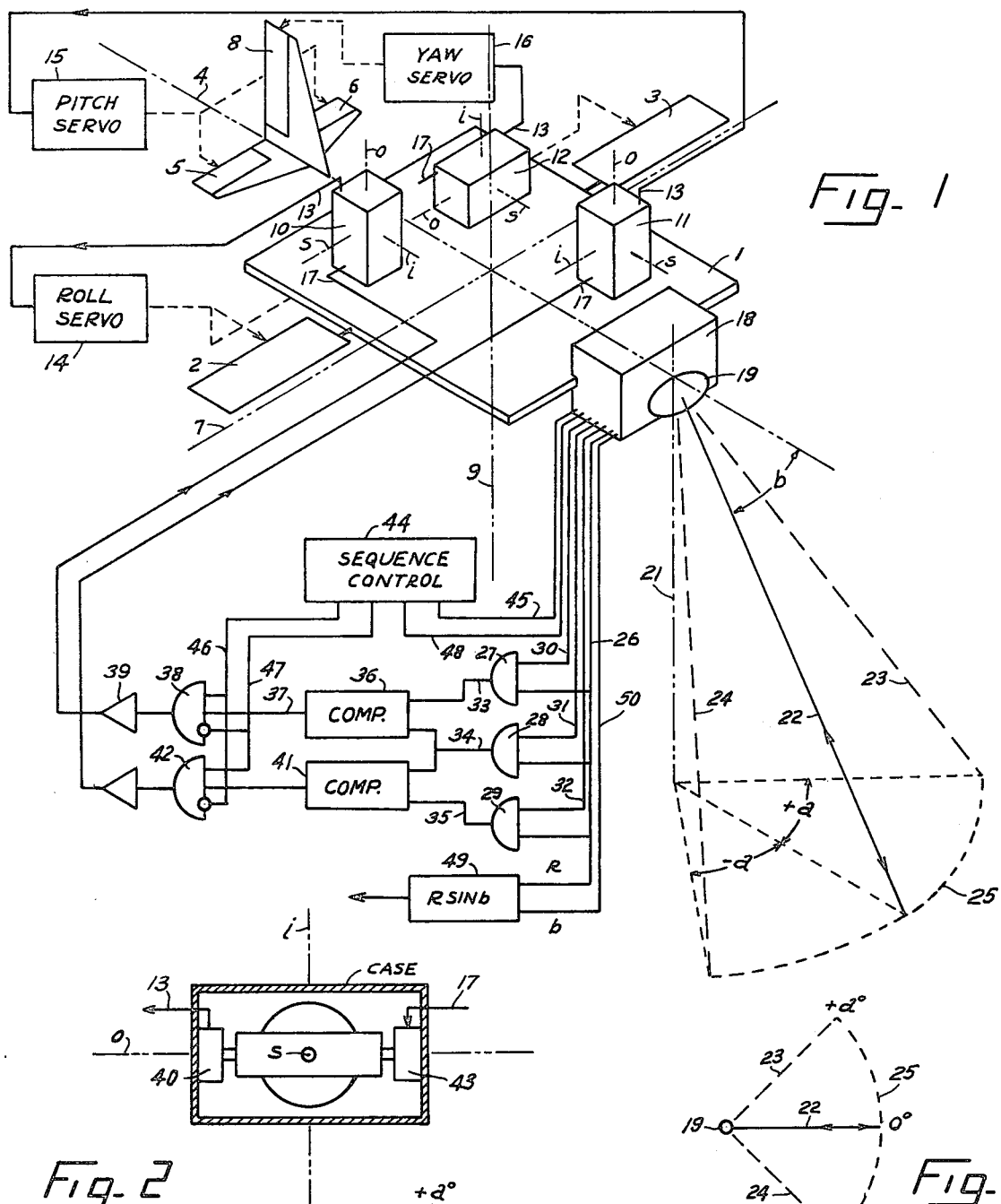
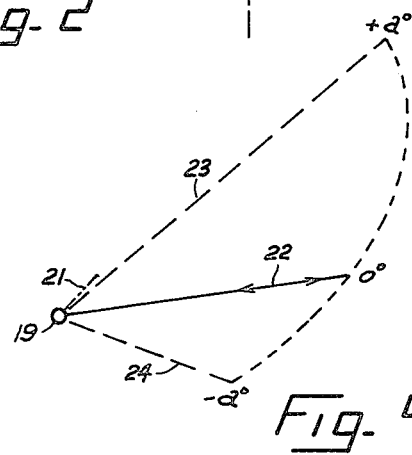
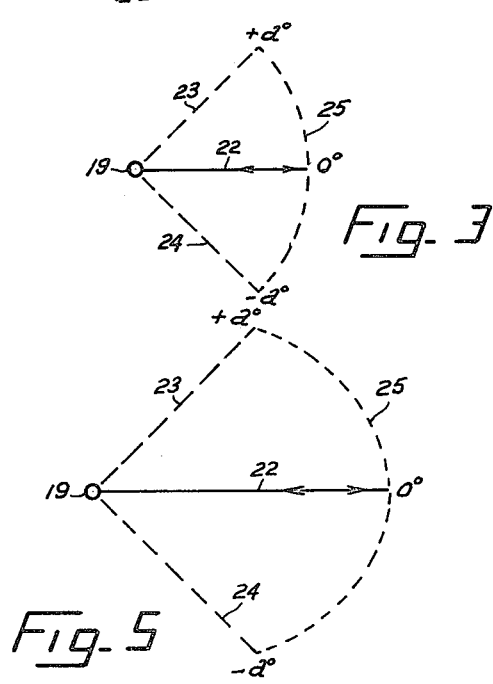

ELECTRONIC TRIPOD TECHNIQUE

RIGHTS OF THE GOVERNMENT

The invention described herein may be manufactured and used by or for the Government of the United States for all governmental purposes without the payment of any royalty.

BACKGROUND OF THE INVENTION

The invention relates to guidance systems for missiles, particularly those launched from aircraft.

Many tactical missiles, after being launched from an aircraft, are required to fly a constant altitude, constant heading path in the cruise search mode. The missile is held to this path by an inertial system in which rate gyros provide the yaw, pitch, and roll angle references. These references must be properly aligned. Yaw or heading reference alignment can be provided by the launch aircraft with reasonable accuracy. However, the roll and pitch references, which must be aligned to the local vertical, can not be provided by launch aircraft attitude with sufficient accuracy. This is particularly true for the pitch reference because of the wide range of pitch attitudes employed by delivery aircraft. Prelaunch alignment of the roll and pitch references involves significant technical complexity and cost, which are not compatible with a basic missile design objective of simplicity. For maximum design and operational simplicity, it would be highly advantageous if the missile could execute its own alignment of the roll and pitch gyros after launch. It is the object of the invention to provide such alignment.

SUMMARY OF THE INVENTION

If the target seeker of the missile can provide range to ground data, an "electronic tripod" technique can be employed to align the roll and pitch gyros and to provide altitude information for comparison with the assigned cruise altitude. Explaining the technique briefly, prior to launch the gyros are spun up and caged to the axes of the missile airframe. Therefore, the initial alignment of the gyros in space is established by the attitude of the launch aircraft. At launch the gyros are uncaged and the inertial system acts to realign and stabilize the missile airframe to the roll, pitch, and yaw space references in effect at the instant of launch if such initial alignment was disturbed by the launch transients. With the seeker pitch angle depressed to achieve a ground return, a ground search is initiated to measure the slant range to ground across an azimuthal sweep of, for example, ±45° measured from the plane of the missile's roll and yaw axes, and the ranges at the extremes of the sweep are compared. If unequal, a roll error is indicated and a roll error signal is generated which is used to torque the roll gyro and thereby roll the missile until the ranges at the sweep extremes are equal and the error signal is zero. The proper roll reference in space, normal to the local vertical, is now established at the roll gyro and the missile stabilizes at this roll attitude. The slant range at either extreme of the azimuth sweep is now compared with the slant range at 0° azimuth. If unequal, a pitch error is indicated and an error signal is generated which is used to torque the pitch gyro. This results in a rotation of the missile about its pitch axis until the error signal is zero. The correct pitch reference in space is now established at the pitch gyro and the missile stabilizes at this pitch attitude. With roll and pitch axes thus properly aligned at right angles to the local vertical, the yaw axis of the missile coincides with the local vertical and the altitude of the missile may be derived as the slant range multiplied by the sine of the seeker depression angle.

BRIEF DESCRIPTION OF THE DRAWING

FIG. 1 illustrates schematically the missile and its control system,

FIG. 2 schematically represents a typical single-axis rate gyro,

FIG. 3 represents the slant range conditions that exist when the missile is properly aligned with its yaw axis vertical, FIG. 4 represents the slant range conditions where the missile has both a right roll error and an up pitch error, and FIG. 5 represents the slant range conditions with an up pitch error but zero roll error.

DETAILED DESCRIPTION

Referring to FIG. 1, the missile is schematically shown as a stabilized platform 1 having a roll control such as ailerons 2 and 3 for rotating the missile about its roll axis 4, a pitch control such as elevators 5 and 6 for rotating the missile about its pitch axis 7, and a yaw control such as rudder 8 for rotating the missile about its yaw axis 9. Any suitable other means may be used for this purpose. The missile is stabilized in roll, pitch, and yaw by roll, pitch, and yaw single-axis rate gyros 10, 11, and 12, respectively. A typical single-axis rate gyro is shown schematically in FIG. 2. Each gyro is positioned on the platform with its input axis i parallel to the missile axis with which it is associated, which places the spin axis s normal to the associated missile axis. The output axis o is normal to the spin and input axes. Rotation of the gyro about its input axis causes it to precess about its output axis with a precessive torque proportion to the rate of rotation. A signal generator 40 coupled to the output axis produces an electrical signal on line 13 proportional to the precessive torque and indicative of its direction. Thus, any tendency for the missile to rotate about its roll axis produces a signal on line 13 of roll gyro 10 which acts through roll servo 14 to move the ailerons 2-3 in the proper direction to oppose the rotation. In this manner the missile is stabilized about its roll axis. Similarly, the missile is stabilized about its pitch and yaw axes by pitch and yaw gyros 11 and 12 acting through pitch and yaw servos 15 and 16, respectively. The output axis of each gyro is also equipped with a torque motor 43 which is energized over line 17. The application of energization to the torque motor applies a torque to the gyro output axis similar to the torque applied to the output axis by precession of the gyro. Its effect is to produce a signal from the signal generator causing the missile to rotate about the corresponding roll, pitch, or yaw axis in such direction that the resulting precessive torque opposes and balances the torque applied by the torque motor. This rotation continues as long as the torque motor energization is present and results in a change in the direction of the gyro spin axis in space. When the torque signal is removed rotation of the missile stops and it stabilizes at the new angular position about the corresponding axis. This feature is made use of in the invention in realigning the roll and pitch gyros to the local vertical.

The target seeker of the missile is represented by block 18 and comprises all of the apparatus necessary to determine direction and range by radar. This includes a directional antenna 19 that may be directed downward by an angle b to obtain slant range to ground and may be rotated in yaw about its yaw axis 21, which, for the purpose of this invention, is parallel to the yaw axis 9 of the missile. The overall design of the seeker and the manner in which it guides the missile to the target are not parts of this invention and need not be described. For the purpose of this invention it is only necessary that the antenna be able to assume a fixed depression angle b below the plane defined by the pitch and roll axes of the missile sufficient to produce ground returns for slant range to ground measurements, and that the antenna be able to scan in azimuth about its yaw axis 21 through an angular range of $\pm a°$, for example $\pm 45°$, measured from the plane defined by the roll and yaw axes of the missile. This scanning is illustrated in FIG. 1 where solid line 22 represents the radar beam in its 0° position and dashed lines 23 and 24 represent the extreme beam positions of $+a°$ and $-a°$. It will be apparent that the scanning beam 22 generates the surface of a cone having an axis coincident with the antenna yaw axis 21. When the missile is perfectly aligned to the local vertical, as in FIG. 1, the yaw axes of the missile and the antenna coincide with the vertical and the intersection between the conical scanning surface and the ground is a segment 25 of the circumference of a circle centered on the yaw axis 21.

The radar system 18 during the slant range mode of operation produces a signal on line 26 that is proportional to instantaneous slant range. This signal is applied to each of AND gates 27, 28, and 29. Short sampling pulses are produced on lines 30, 31, and 32 each time the scanning beam is at the aximuth angles of $+a°$, $-a°$, and 0°, respectively, and are applied to AND gates 27, 28, and 29, respectively. Therefore the outputs of these gates on lines 33, 34, and 35 represent the slant ranges at $+a°$, $-a°$, and 0°, respectively. Comparator 36, which receives the ranges at $+a°$ and $-a°$ as inputs, produces on output line 37 a signal proportional in magnitude to the difference betwween these ranges and which also carries information as to which range is the greater. The latter may be in the form of polarity or phase, depending upon whether a DC or an AC system is employed. This signal, after passing gate 38 and amplification in amplifier 39, becomes the roll error signal and is applied to torque motor line 17 of roll gyro 10. Similarly, comparator 41 produces a signal at its output proportional to the difference between the range at $-a°$ and at 0° which, after passing gate 42 and amplification, becomes the pitch error signal and is applied to the torque motor line 17 of pitch gyro 11.

The entire gyro alignment procedure is controlled by sequencing circuit 44. To start the operation a start signal is applied over line 45 to seeker 18 which causes antenna 19 to assume the fixed depressed position shown and initiates the scan over the $\pm a°$ range. At the same time a voltage is applied over line 46 to gates 38 and 42 for the purpose of opening gate 38 and inhibiting gate 42. During the time this voltage is applied the roll error signal is applied to the roll gyro and the roll correction occurs. The voltage on line 46 is then removed and a similar voltage is applied to line 47 which inhibits gate 38 and opens gate 42 allowing the pitch correction to take place. After the pitch correction a stop signal is applied over line 48 to the seeker 18 returning it to normal operation.

As already stated, the missile in FIG. 1 is illustrated in proper alignment with the local vertical. Under this condition the yaw axes 9 and 21 coincide with the local vertical, the yaw axis 21 of the antenna intersects the ground at a point directly beneath the antenna, and the ground path 29 of the scanning beam 22 is a segment of a circle centered on axis 21. As a result all points on path 25 are equidistant from antenna 19 and the slant ranges along paths 22, 23, and 24 are equal. This situation is also illustrated in the plan view of FIG. 3.

In the presence of a roll error or a pitch error, or both, the yaw axis 21 of the antenna is no longer vertical and the intersection 25 of the conical surface generated by the scanning beam 22 with the ground is no longer a circle but is a segment of an ellipse. This situation is illustrated in the plan view of FIG. 4 for a combined "right" roll error and "up" pitch error. Since path 25 is elliptical, the slant ranges along paths 22 (0°), 23 ($+a°$), and 24 ($-a°$) are unequal. In the manner described for FIG. 1, the roll error is corrected first by a roll error signal produced at the output of gate 38 as a result of the inequality between the $+a°$ and $-a°$ ranges. The error signal acts through the torque motor of roll gyro 10 to apply a torque to the output or gimbal axis of the gyro. This produces a signal on line 13 from the signal generator of gyro 10 which actuates the ailerons in the proper direction to roll the missile to the left. The roll continues until the slant ranges along paths 23 and 24 are equal, at which point the roll error signal disappears and the missile stabilizes with repsect to the new roll reference established by this process at the roll gyro. The missile roll attitude is now in alignment with the local vertical, i.e. the yaw axes of the missile and the seeker antenna lie in the vertical plane that contains the longitudinal or roll axis of the missile. This situation is illustrated in FIG. 5 where the slant ranges at $+a°$ and $-a°$ are equal but the range at 0° is greater than at the extremes of the sweep. In this case the ground track 25 is still a sector of an ellipse but the ellipse is now symmetrical to the longitudinal axis of the missile.

Following the roll error correction the pitch error is corrected in a similar manner. As explained for FIG. 1, the pitch error signal at the output of gate 42 is derived from the difference between the slant range at 0° and the slant range at $-a°$. The $+a°$ range could as well have been used since the two are equal in the absence of a roll error. The pitch error signal is applied to the torque motor of pitch gyro 11 and, by the process already explained for roll, causes the missile to rotate downward about its pitch axis until the slant range at 0° equals that at $-a°$ and the error signal disappears. The missile then stabilizes at the new pitch reference which is in alignment with the local vertical. Both roll and pitch errors having been removed, the yaw axes 9 and 21 are vertical and the situation illustrated in FIGS. 1 and 3 is restored.

With the yaw axis vertical the altitude of the missile may be obtained as R sin b, where R is the slant range. An altitude voltage can be provided by a computer 49 which derives a slant range input from line 26 and a b input from seeker 18 over line 50. This voltage may be compared to an assigned cruise altitude voltage for maintaining the cruise altitude constant.

I claim:

1. In a vehicle for travel at a distance above the earth's surface having roll and pitch rate gyros for stabilizing the vehicle about its roll and pitch axes, each gyro having a torque motor for applying a torque to the gyro about its output axis, apparatus for aligning said gyros to the local vertical, said apparatus comprising: means for measuring the slant range to ground in a direction depressed by a constant acute angle from the plane of the roll and pitch axes of the vehicle; means for producing an azimuthal scanning of said direction about an axis parallel to the yaw axis of the vehicle and over an angular range of $\pm a$, where a is an acute angle measured from the plane of the roll and yaw axes of the vehicle; means for continuously deriving a roll error signal proportional to the difference between the slant ranges at the two extremes of the scanning range; means for applying said roll error signal to the torque motor of the roll gyro for rotating the vehicle about its roll axis until said roll error signal is zero; means for continuously deriving a pitch error signal proportional to the difference between the range at one extreme of said sweep and the range at the center of the sweep; and means operative after said roll error signal has been reduced to zero to apply the pitch error signal to the torque motor of said pitch gyro for rotating said vehicle about its pitch axis until the pitch error signal is zero.

2. Apparatus as claimed in claim 1 and in addition means operative after said roll and pitch error signals have been reduced to zero to derive altitude as the product of the instantaneous slant range and the sine of the angle of the range direction depression below the plane of the roll and pitch axes.

* * * * *